United States Patent [19]
Lewis

[11] 3,977,253
[45] Aug. 31, 1976

[54] POOL FILTER PRESSURE GAUGE

[76] Inventor: Kenneth Lewis, 11201 S. Garfield, South Gate, Calif. 90280

[22] Filed: Sept. 8, 1975

[21] Appl. No.: 610,919

[52] U.S. Cl. .................................... 73/401; 73/38
[51] Int. Cl.² ........................................... G01L 7/18
[58] Field of Search ............... 73/38, 73, 401, 389, 73/388

[56] References Cited
UNITED STATES PATENTS

| | | | |
|---|---|---|---|
| 2,801,538 | 8/1957 | Matson | 73/401 |
| 3,891,120 | 6/1975 | Loesch | 73/401 |

Primary Examiner—Donald O. Woodiel
Attorney, Agent, or Firm—Christie, Parker & Hale

[57] ABSTRACT

A gauge for a pool filter in which the gauge includes a housing mounted on top of the filter, the housing having an interior chamber which is fluid connected at the bottom to the upper interior of the filter. The removable top of the gauge housing supports a vertical tube extending down into the chamber, the tube being open only at the lower end. A cup-shaped member is supported inside the chamber and receives the tube. The interior of the tube is visible from outside the housing for observing the level of liquid in the tube.

14 Claims, 3 Drawing Figures

U.S. Patent  Aug. 31, 1976  3,977,253
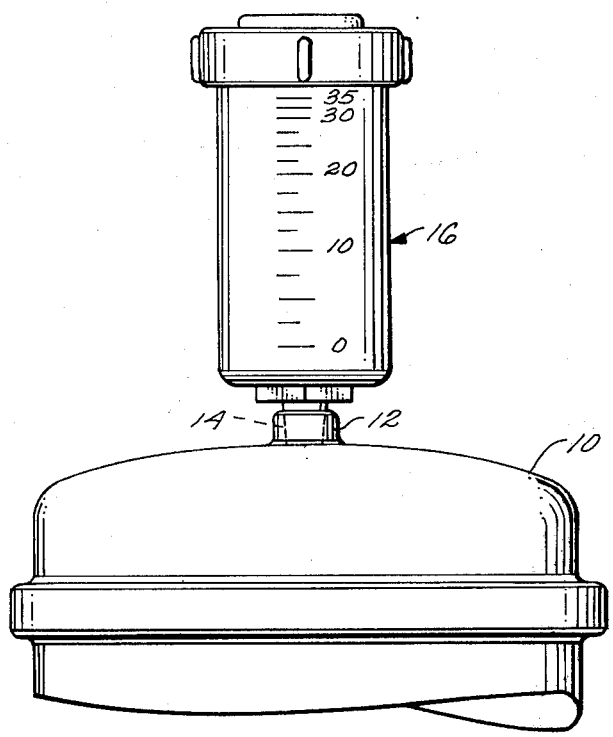
Fig. 1
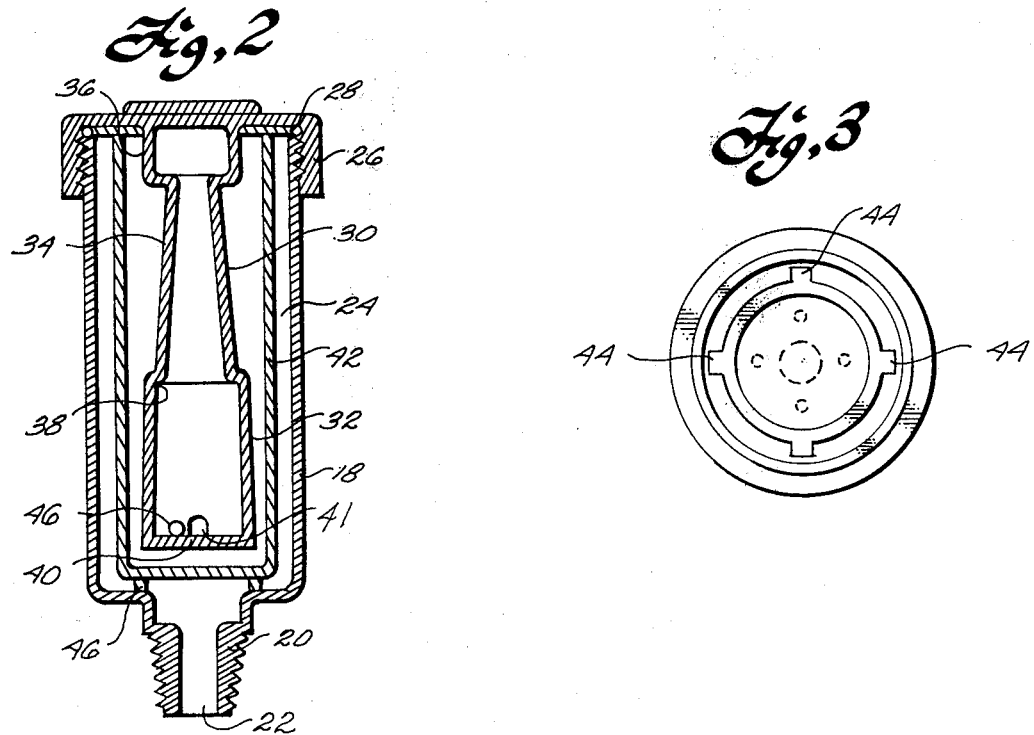
Fig. 2
Fig. 3

POOL FILTER PRESSURE GAUGE

FIELD OF THE INVENTION

This invention relates to liquid pressure gauges, and more particularly, is concerned with a pressure gauge for use in combination with swimming pool filters.

BACKGROUND OF THE INVENTION

Diatomaceous earth type pool filters require that the earth material be replaced when the filter becomes dirty through continuous use. To determine when the filter material should be replaced, it has been the practice to provide an indication of the inlet pressure to the filter. Dirt removed from the water gradually clogs the pores of the diatomaceous earth thereby increasing the back pressure on the pump.

It has been the practice in the past to provide a conventional Bourdon type pressure gauge which is connected to the top of the filter housing on the inlet side of the filter. Associated with the coupling gauge is a stop cock or valve for bleeding off air which may become trapped in the top of the filter housing. The combination of the valve, pressure gauge, and coupling to the top of the filter, which conventionally are made of brass, add a substantial cost to the pool filter installation.

SUMMARY OF THE INVENTION

The present invention is directed to an improved pressure gauge which may be constructed entirely of plastic materials without moving parts. The gauge incorporates means for bleeding air from the filter so as to eliminate the need for a separate bleeder valve.

This is accomplished, in brief, by providing a housing of transparent plastic material forming a chamber therein with means for fluid coupling the chamber to the top of the pool filter. The housing includes a removable cap for opening and closing the chamber to the atmosphere. A tubular member attached to the inside of the cap extends vertically downward inside the housing, the lower end of the tubular member being open to the interior of the chamber and the top of the tubing being sealed. A cup-shaped member is positioned inside the chamber which opens adjacent the top of the chamber above the level at which liquid enters the chamber. The lower end of the tubular member extends downwardly inside the cup-shaped member so that the level of the liquid entering the chamber must rise above the top of the cup-shaped member to fill the cup-shaped member with liquid and trap air in the tubular member. The level to which liquid rises in the tubular member provides an indication of the water pressure in the filter.

DESCRIPTION OF THE DRAWINGS

For a more complete understanding of the invention reference should be made to the accompanying drawing, wherein:

FIG. 1 is an elevational view of the invention installed in a pool filter;

FIG. 2 is a sectional view of the pressure gauge; and

FIG. 3 is a top view of the gauge with the cap removed.

DETAILED DESCRIPTION

Referred to the drawing in detail, the numeral 10 indicates the top of a conventional pool filter. The interior of the filter housing is filled with water from the discharge side of the pool circulating pump. This may cause air to be trapped in the top of the filter, particularly after the filter housing has been open to clean or replace the filter material. It has been the practice in the past to provide some type of stop cock in the filter top to bleed off this air to insure that the filter is completely filled with circulating pool water. Also it has been the practice in the past that a T-connection is provided in connection with the stop cock to which a conventional Bourdon tube pressure gauge is connected to indicate the fluid pressure in the top of the filter unit. For this purpose, the top of the filter housing is provided with a lug 12 having a threaded opening 14 for connecting to a bleeder valve and standard pressure gauge.

The pressure gauge according to the present invention, indicated generally at 16, includes an outer housing 18 of general cylindrical shape terminating at its lower end in a threaded nipple 20 for attaching the gauge to the filter. A fluid passage 22 through the center of the nipple 20 provides fluid communication from the interior of the filter into a chamber 24 in the inside of the housing 18.

The upper end of the housing 18 is open and is adapted to receive a threaded cap 26 which screws down over the open end of the housing 18. A suitable gasket, such as an O-ring 28 is inserted between the inside of the cap 26 and the top of the housing 18 to provide a fluid-tight seal when the cap 26 is tightened down on the housing. Supported on the inside of the cap 26 and extending down into the chamber 18 is a tubular member 30. The tubular member 30 includes a lower section 32, an intermediate section 34, and an upper section 36. The lower section 32 if of slightly larger diameter than the intermediate section 34, a slight step 38 being formed at the junction between the lower and intermediate sections of the tubular member 30. The top section 36 is enlarged in diameter to form an enlarged volume at the top of the tubular member 30. The upper portion 36 is integral with the top of the cap 26 so that the tubular member 30 and the cap 26 form an integral structure. The lower end of the tubular member 30 is provided with a bottom plate 40. One or more small openings 41 are formed adjacent the bottom plate 40 to provide fluid communication between the interior of the tubular member 30 and the chamber 24.

Also inserted in the chamber 24 is a cup-shaped member 42 which is separate from the housing 18 and the cap 26. With the cap 26 removed, the cup-shaped member 42 may be inserted in the chamber 24. The wall of the cup-shaped member is held in concentric relation to the housing 18 by a plurality of external ribs 44. The bottom of the cup-shaped member is spaced from the bottom of the housing 18 by integrally moulded lugs 46. The top of the cup-shaped member 42 is roughly even with the top of the housing 18 and is spaced from the inside of the cap 26 by roughly the thickness of the O-ring gasket 28.

Thus it will be seen that with the gauge 16 mounted in position on the top of the filter water may enter the passage 22 from the filter, pass upwardly in the spaces between the outside of the cup-shaped member 42 and the interior of the housing 18 over the top edge of the cup-shaped member 42 so as to fill the cup-shaped member. The cap 26 must be loosened to permit air to escape from the top of the chamber 24. It is displaced by the water being forced upwardly into the chamber from the filter. As the water level rises inside the cup-shaped member 42, air is trapped inside the tubular member 30. As the pressure of the water increases, the trapped air in the tubular member 30 is compressed and the level of the water in the tubular member rises by an amount dependent on the pressure of the water in the filter. By making the parts of the gauge of a transparent plastic material, the level of the water inside the tubular member 30 can be observed. To make the level more visible, a float in the form of a small colored bead 46 is placed inside the tubular member 30. The bead floats on the surface of the water as it rises in the tubular member, thus providing a clear indication of the level of the water. A suitable scale may be inscribed on the outside of the housing, as shown in FIG. 1, for calibrating the level of the bead in units of pounds of pressure.

Normally the step 38 is positioned to correspond to the normal operating pressure of the pool filter system. Small changes in pressure within the normal range, because of the larger cross-sectional area of the lower end of the tubular member 30, do not produce significant change in the level of the water within the tubular member. However, as the filter becomes dirty and the pressure level builds up, once the level extends into the reduced diameter intermediate section 34, the amount of level change with a given incremental pressure change is increased, providing an expanded scale in this region. This offsets the normal exponential relationship between pressure and change in volume which would otherwise tend to compress the scale as the pressure increased. The enlarged volume at the upper end 36 of the tubular member allows adjustment of the scale range on the side of the housing to the desired operating range of the system.

From the above description it will be seen that a very simple gauge is provided which can be readily moulded from plastic materials and which requires no moving parts for its operation. The cap of the gauge provides a means of bleeding air from the filter system. The cup-shaped member 42 retains water surrounding the tubular member 30 even though some air may accumulate in the filter and enter the chamber 24 of the gauge. Thus the gauge continues to function even though the filter system may have some air leakage in the system.

What is claimed is:

1. A pressure gauge for a pool filter or the like, comprising:
a housing, connecting means having a passage for connecting the bottom of the housing to a source of liquid under pressure, a removable cap at the top of the housing, a transparent tube extending vertically in the housing, the tube being closed at the top and open at the bottom, and a transparent cup inside the housing, the tube extending down into the cup, at least a portion of the housing being transparent whereby the level of liquid in the tube is visible from outside the housing.

2. The gauge of claim 1 further including means forming a vertical scale for measuring the height the liquid rises in the tube.

3. The gauge of claim 1 further including a float in the tube for indicating the level of the liquid.

4. Apparatus of claim 1 wherein the tube is secured to the inside of the cap at the top of the tube.

5. Apparatus of claim 1 wherein the inside of the tube is larger in cross-section near the lower end than in the lower intermediate portion.

6. Apparatus of claim 5 wherein the tube changes size abruptly at an intermediate point along its length.

7. Apparatus of claim 5 wherein the top of the tube is enlarged in cross-section.

8. A gauge comprising a housing having a chamber therein, means coupling the chamber to a source of liquid under pressure, a member secured to the housing at the top of the chamber for opening and closing the chamber to the atmosphere, a tubular member extending vertically inside the housing, the lower end being open to the interior of the chamber and the upper end being closed, whereby liquid rising in the chamber traps air in the tube, and a cup-shaped member in the chamber open adjacent the top of the chamber above the level at which liquid enters the chamber through the liquid coupling means, the lower end of the tubular member extending downwardly inside the cup-shaped member, whereby the level of liquid entering the chamber must rise above the top of the cup-shaped member to fill the cup-shaped member with liquid and trapping air in the tubular member.

9. The gauge of claim 8 wherein the interior of the tubular member is visible from outside the housing.

10. The gauge of claim 9 wherein a float is positioned inside the tubular member.

11. Apparatus of claim 9 wherein the tubular member decreases in cross-section from the bottom up to an intermediate level.

12. Apparatus of claim 11 wherein the upper end of the tubular member has a greater cross-section than at said intermediate level.

13. A combination pressure gauge and air bleeder for a pool filter comprising a housing forming a fluid-tight chamber, means for opening and closing the top of the chamber to the atmosphere to release air trapped in the chamber, fluid conductive means connecting the bottom of the chamber to the top of the filter for directing pool water under pressure from the filter into the chamber, a hollow tube extending downwardly from the top of the housing into the chamber, the interior of the tube being open only adjacent the lower end thereof, whereby air is trapped in the tube by water rising in the chamber, and means visible from outside the chamber indicating the level of the water in the tube, said means for opening and closing the chamber including a removable screw cap forming the top of the housing, the upper end of the tube being secured to the inside of the cap, whereby the tube and cap are removable as a unit.

14. The gauge of claim 13 further including means forming a cup-shaped region within the chamber having an open top and closed bottom, water entering the region through the open top, the lower end of the tube extending into the cap-shaped region, whereby the lower end is sealed by water retained in the cup-shaped region even when the level of water in the chamber drops.

* * * * *